United States Patent
Yamamoto

(10) Patent No.: US 8,443,042 B2
(45) Date of Patent: May 14, 2013

(54) INFORMATION PROCESSING APPARATUS AND METHOD, PROGRAM, AND INFORMATION PROCESSING SYSTEM

(75) Inventor: Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 12/328,511

(22) Filed: Dec. 4, 2008

(65) Prior Publication Data
US 2009/0150491 A1 Jun. 11, 2009

(30) Foreign Application Priority Data
Dec. 7, 2007 (JP) ................................ P2007-317040

(51) Int. Cl.
*G06F 15/16* (2006.01)

(52) U.S. Cl.
USPC ........... 709/204; 709/205; 709/223; 705/26.7

(58) Field of Classification Search ................. 709/204, 709/205, 223; 705/26.7
See application file for complete search history.

(56) References Cited

U.S. PATENT DOCUMENTS

| | | | |
|---|---|---|---|
| 2006/0041585 A1* | 2/2006 | Ebihara et al. | 707/104.1 |
| 2006/0041589 A1* | 2/2006 | Helfman et al. | 707/104.1 |
| 2006/0161950 A1 | 7/2006 | Imai et al. | |
| 2006/0250994 A1* | 11/2006 | Sasaki et al. | 370/264 |
| 2007/0100840 A1 | 5/2007 | Matsubara | |
| 2008/0021895 A1* | 1/2008 | Stevenson et al. | 707/5 |
| 2009/0286560 A1* | 11/2009 | Willis | 455/466 |

FOREIGN PATENT DOCUMENTS

| | | |
|---|---|---|
| JP | 2004-194107 | 7/2004 |
| JP | 2004-207897 | 7/2004 |
| JP | 2007-94738 | 4/2007 |
| WO | WO 2005/071951 A1 | 8/2005 |

* cited by examiner

*Primary Examiner* — Liangche A Wang
*Assistant Examiner* — Cheikh Ndiaye
(74) *Attorney, Agent, or Firm* — Finnegan, Henderson, Farabow, Garrett & Dunner, L.L.P.

(57) ABSTRACT

An information processing apparatus used by a first user, includes a generating unit adapted to generate recommendation information at least including an identifier for uniquely identifying a content recommended on the basis of preference information of the first user, and a sending unit adapted to send the generated recommendation information to another information processing apparatus which is used by a second user who is the same as or different from the first user and adapted to present the content recommended on the basis of the identifier included in the recommendation information.

22 Claims, 11 Drawing Sheets

FIG. 3

| "MUSIC" | "STD" | S-ID | Content Title | "STD" | S-ID | Content Title | . . . |

FIG. 9

| "MUSIC" | "MUSIC" | "STD" | S-ID | Content Title | "STD" | S-ID | Content Title | ... |

| "Major" | Value | "Wide" | Value | "Deep" | Value |

FIG. 10

| "Recommend" | "MUSIC" | "STD" | S-ID | Content Title | "STD" | S-ID | Content Title | ... |

| "Major" | Value | "Wide" | Value | "Deep" | Value |

INFORMATION PROCESSING APPARATUS AND METHOD, PROGRAM, AND INFORMATION PROCESSING SYSTEM

CROSS REFERENCES TO RELATED APPLICATIONS

The present invention contains subject matter related to Japanese Patent Application JP 2007-317040 filed in the Japanese Patent Office on Dec. 7, 2007, the entire contents of which are incorporated herein by reference.

BACKGROUND OF THE INVENTION

1. Field of the Invention

The present invention relates to an information processing apparatus and method, a program, and an information processing system. In particular, an information processing apparatus and method, a program, and an information processing system in which preference information of a user can be easily shared.

2. Description of the Related Art

Up to now, an invention has been proposed related to so-called content personalization for searching and recommending a content such as a television program and a music on the basis of a preference of a user (see, for example, Japanese Unexamined Patent Application Publication No. 2004-194107).

For the content personalization, a method referred to as Collaborative Filtering (hereinafter, which is referred to as CF method) or a method referred to as Collaborative Based Filtering (hereinafter, which is referred to as CBF method) are widely used.

According to the CF (Collaborative Filtering) method, purchase histories of the respective users are managed. For a user to which a content is to be recommended, another user having a similar purchase history is detected, and a content which has been purchased by the other user but has not been purchased by the relevant user is recommended. For example, the CF method is utilized in a mail-order marketing site on the internet.

According to the CBF (Content Based Filtering) method, metadata previously assigned to a content on a distribution side or a sales side is directly utilized for an extraction of a preference or a recommendation of a content. That is, a distance between a characteristic vector representing a preference of a user and a characteristic vector of the respective candidate music pieces (cosine correlation or the like) is calculated, the music having the short distance as a result of the calculation is regarded to be matching to the preference of the user, and this music is recommended.

SUMMARY OF THE INVENTION

However, in a circumstance where the preference information individually is extracted by a large number of apparatuses, such a situation is generated that a hard-earned preference model obtained by a certain apparatus may be difficult to used by another apparatus, which becomes a problem.

To cope with this problem, an approach for unifying a schema for a preference representation is conceivable, but, for example, types of metadata are varied depending on content types such as television programs, musics, and movies, and furthermore, formats are varied for each apparatus even in the case of the same content, it is difficult to adopt this method in reality.

On the other hand, an approach of a so-called meta sharing for allowing the respective apparatuses to understand metadata of contents also exists. In that case, sharing of an ontology or a dictionary which is the base of understanding among the respective apparatuses is demanded. Furthermore, in order to generate a preference profile from the sharing of the ontology or the dictionary, it may be necessary to understand a meaning of an operation performed by another apparatus and also prepare an operation ontology. Development of the ontologies is extremely difficult even when the area is divided. When a consideration is given of a case in which the sharing among the apparatuses having different media types where the ontologies can be coped with (musics, television programs, movies, books, and the like), it is also difficult to adopt this method in reality.

The present invention has been made in view of the above-described circumstances, and the invention therefore allows such a situation where the preference information of the user can be easily shared by different apparatuses.

According to an embodiment of the present invention, there is provided an information processing apparatus used by a first user, including: generating means configured to generate recommendation information at least including an identifier for uniquely identifying a content recommended on the basis of preference information of the first user; and sending means configured to send the generated recommendation information to another information processing apparatus which is used by a second user who is the same as or different from the first user and adapted to present the content recommended on the basis of the identifier included in the recommendation information.

In the information processing apparatus according to the embodiment of the present invention, the identifier may belong to any one of a standard system in conformity to a predetermined specification and an independent system based on an independent specification, and the generating means may generate, in a case where the identifier belongs to the standard system, the recommendation information on the basis of the identifier belonging to the standard system In the information processing apparatus according to the embodiment of the present invention, the recommendation information may further include identification information for identifying the content in addition to the identifier, and the generating means may generate, in a case where the identifier belongs to the independent system, the recommendation information on the basis of an identifier belonging to the standard system corresponding to the identification information which is obtained through inquiring a management apparatus adapted to specify the identifier belonging to the standard system from the identification information.

In the information processing apparatus according to the embodiment of the present invention, the recommendation information may further include character information representing a character of the first user.

In the information processing apparatus according to the embodiment of the present invention, the sending means may send the recommendation information to the management apparatus, and the management apparatus may accumulate the recommendation information as a history.

In the information processing apparatus according to the embodiment of the present invention, types of the content may include a music, a still image, a motion picture, and an electronic book, and the identifier may be constructed on the basis of each of the types.

According to an embodiment of the present invention, there is provided an information processing method for an information processing apparatus used by a first user, the information processing method including the steps of: generating recommendation information at least including an identifier for uniquely identifying a content recommended on the basis of preference information of the first user; and performing a control to send the generated recommendation information to another information processing apparatus which is used by a second user who is the same as or different from the first user and adapted to present the content recommended on the basis of the identifier included in the recommendation information.

According to an embodiment of the present invention, there is provided a program executed by a computer adapted to control an apparatus used by a first user, the program including the steps of: generating recommendation information at least including an identifier for uniquely identifying a content recommended on the basis of preference information of the first user; and performing a control to send the generated recommendation information to another apparatus which is used by a second user who is the same as or different from the first user and adapted to present the content recommended on the basis of the identifier included in the recommendation information.

In the information processing apparatus, method, and program according to the embodiment of the present invention, the recommendation information at least including the identifier for uniquely identifying the content recommended on the basis of the preference information of the first user is generated, and the generated recommendation information is sent to the other information processing apparatus which is used by the second user who is the same as or different from the first user and adapted to present the content recommended on the basis of the identifier included in the recommendation information.

In addition, according to an embodiment of the present invention, there is provided an information processing apparatus used by a first user, including: receiving means configured to receive recommendation information sent from another information processing apparatus which is used by a second user who is the same as or different from the first user and adapted to generate the recommendation information at least including an identifier for uniquely identifying a content recommended on the basis of preference information of the second user; and presenting means configured to present the content recommended on the basis of the received recommendation information to the first user.

In the information processing apparatus according to the embodiment of the present invention, the identifier may belong to any one of a standard system in conformity to a predetermined specification and an independent system based on an independent specification, and the presenting means may present, in a case where the identifier belongs to the standard system, the content recommended on the basis of the identifier belonging to the standard system.

In the information processing apparatus according to the embodiment of the present invention, the recommendation information may further include identification information for identifying the content in addition to the identifier, and the presenting means may present, in a case where the identifier belongs to the independent system, the content corresponding to the identification information recommended through inquiring a recommendation apparatus adapted to specify the content corresponding to the identifier belonging to the independent system at least from the identification information and recommend the content.

In the information processing apparatus according to the embodiment of the present invention, the recommendation information may further include character information representing a character of the second user.

In the information processing apparatus according to the embodiment of the present invention, the presenting means may present, in a case where a type of a content desired by the first user is different from a type of the content recommended on the basis of the recommendation information, a content of the desired type recommended through inquiring a management apparatus adapted to recommend the content of the predetermined type on the basis of the recommendation information.

In the information processing apparatus according to the embodiment of the present invention, the management apparatus may accumulate the recommendation information and recommend the content on the basis of the accumulated recommendation information, and the presenting means may present the content recommended from the management apparatus.

The information processing apparatus according to the embodiment of the present invention may further include sending means configured to send a preference response related to a preference of the first user with respect to the content recommended from the management apparatus to the management apparatus, in which the management apparatus accumulates the recommendation information and the preference response and recommends the content on the basis of the accumulated recommendation information and preference response.

In the information processing apparatus according to the embodiment of the present invention, types of the content may include a music, a still image, a motion picture, and an electronic book, and the identifier may be constructed on the basis of each of the types.

In addition, according to an embodiment of the present invention, there is provided an information processing method for an information processing apparatus used by a first user, the information processing method including the steps of: performing a control to receive recommendation information sent from another information processing apparatus which is used by a second user who is the same as or different from the first user and adapted to generate the recommendation information at least including an identifier for uniquely identifying a content recommended on the basis of preference information of the second user; and presenting the content recommended on the basis of the received recommendation information to the first user.

In addition, according to an embodiment of the present invention, there is provided a program executed by a computer adapted to control an apparatus used by a first user, the program including the steps of: performing a control to receive recommendation information sent from another information processing apparatus which is used by a second user who is the same as or different from the first user and adapted to generate the recommendation information at least including an identifier for uniquely identifying a content recommended on the basis of preference information of the second user; and presenting the content recommended on the basis of the received recommendation information to the first user.

In the information processing apparatus, method, and program according to the embodiment of the present invention, the recommendation information is received from the other information processing apparatus which is used by the second user who is the same as or different from the first user and adapted to generate the recommendation information at least including the identifier for uniquely identifying the content recommended on the basis of preference information of the second user, and the content recommended on the basis of the received recommendation information is presented to the first user.

Furthermore, according to an embodiment of the present invention, there is provided an information processing system including: a first information processing apparatus used by a first user; and a second information processing apparatus used by a second user who is the same as or different from the first user, the first information processing apparatus including generating means configured to generate recommendation information at least including an identifier for uniquely identifying a content recommended on the basis of preference information of the first user and sending means configured to send the generated recommendation information to the second information processing apparatus, and the second information processing apparatus including receiving means configured to receive the recommendation information sent from the first information processing apparatus and presenting means configured to present the content recommended on the basis of the identifier included in the received recommendation information to the second user.

In the information processing system according to the embodiment of the present invention, the first information processing apparatus generates the recommendation information at least including the identifier for uniquely identifying the content recommended on the basis of the preference information of the first user and sends the generated recommendation information to the second information processing apparatus, and the second information processing apparatus receives the recommendation information sent from the first information processing apparatus and presents the content recommended on the basis of the identifier included in the received recommendation information to the second user.

As described above, according to the embodiments of the present invention, the preference information of the user can be easily shared.

BRIEF DESCRIPTION OF THE DRAWINGS

FIG. 3 illustrates a schema example of a recommended music ID list;

FIG. 9 illustrates a schema example of a recommended music ID list;

FIG. 10 illustrates a schema example of a recommended music ID list; and

DESCRIPTION OF THE PREFERRED EMBODIMENTS

Hereinafter, embodiments of the present invention will be described with reference to the drawings.

Figure 1:
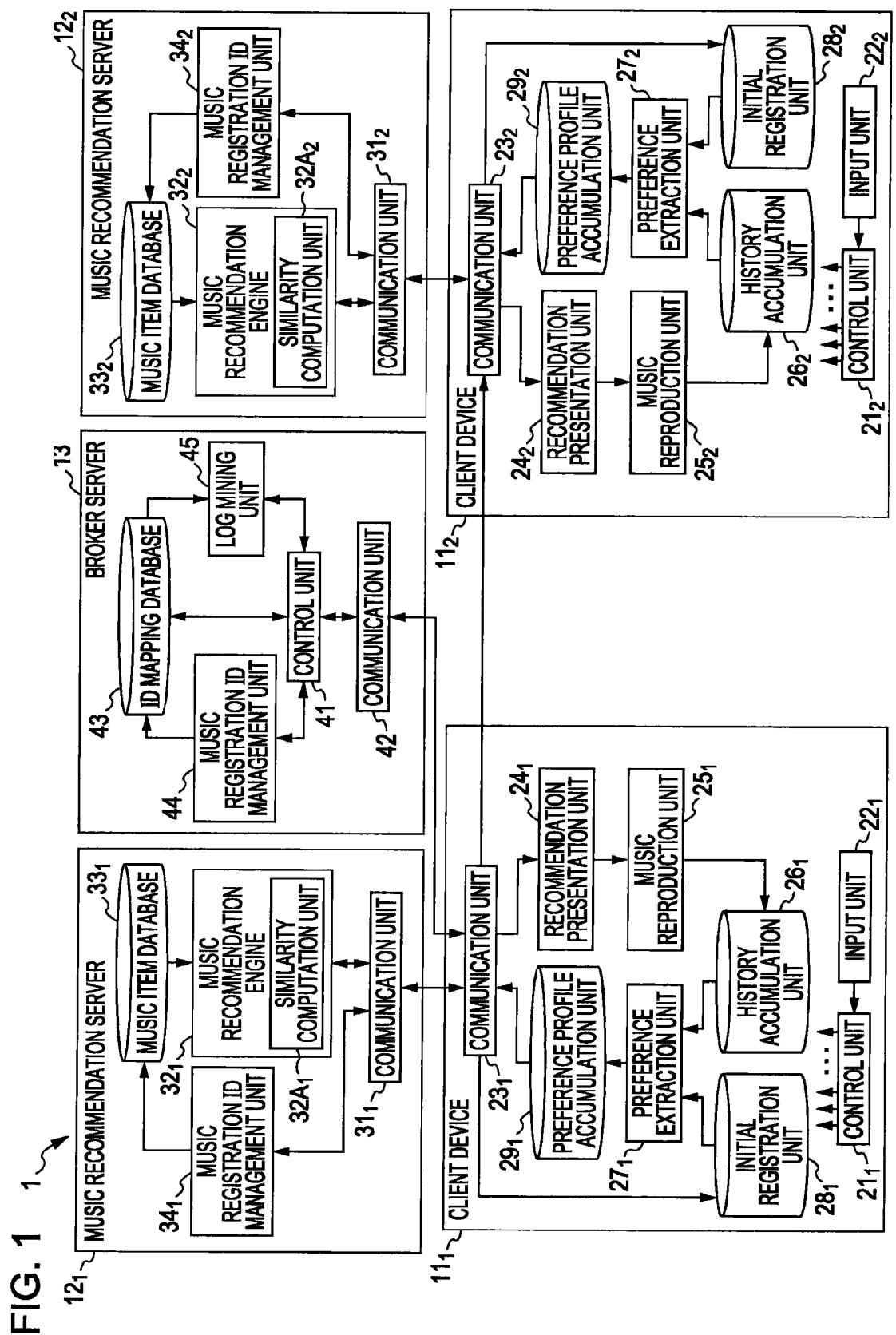
FIG. 1 is a block diagram of a configuration of a content recommendation system according to an embodiment of the present invention.

FIG. 1 is a block diagram of a configuration of a content recommendation system according to an embodiment of the present invention.

A content recommendation system 1 is composed of a client device $11_1$, a client device $11_2$, a music recommendation server $12_1$, a music recommendation server $12_2$, and a broker server 13.

It should be noted that the content type dealt with by the content recommendation system 1 in the example of FIG. 1 is music (song). In other words, the content recommendation system 1 is composed of a system capable of performing a preference extraction in a music download service, in particular. For that reason, in the example of FIG. 1, the music recommendation server $12_1$, the music recommendation server $12_2$, and the broker server 13 are provided.

Also, hereinafter, for simplicity of the description, a music downloaded to the client device $11_1$ and reproduced is treated as a music preferred by a user who uses the client device $11_1$ (hereinafter, referred to as preferred music).

The client device $11_1$ is composed, for example, of a device capable of reproducing the music such as a portable music player, a personal computer, or a mobile phone. The client device 1 is adapted to reproduce a music recommended from the music recommendation server $12_1$.

The client device 1 is composed by including a control unit $21_1$, an input unit $22_1$, a communication unit $23_1$, a recommendation presentation unit $24_1$, a music reproduction unit $25_1$, a history accumulation unit $26_1$, a preference extraction unit $27_1$, an initial registration unit $28_1$, and a preference profile accumulation unit $29_1$.

On the basis of the operation signal supplied from the input unit $22_1$, the control unit $21_1$ controls the respective units of the client device $11_1$. At this time, on the basis of the operation on the client device 1 performed by the user, the input unit $22_1$ supplies the operation signal to the control unit $21_1$.

While following the control of the control unit $21_1$, the communication unit $23_1$ performs a communication with another device such as the client device $11_2$ or the music recommendation server $12_1$.

The recommendation presentation unit $24_1$ is adapted to present the user a recommended music to be recommended to the user of the client device $11_1$ (hereinafter, referred to as recommended music) which is distributed via the communication unit $23_1$ from the music recommendation server $12_1$. To be more precise, the presentation of the recommended music does not means a presentation by way of reproduction of the entire recommended music, but means, for example, a presentation by way of reproduction of a part of the recommended music and a presentation of information generated from metadata of the recommended music. To be more specific, the presentation means a presentation by way of display of image information, a presentation by way of audio output of audio information, and the like.

When the user accepts this recommendation and provides an instruct for listening to the recommended music via the input unit $22_1$ to the control unit $21_1$, the music reproduction unit $25_1$ reproduces the instructed music.

The music reproduced by the music reproduction unit $25_1$, that is, the music listened to by the user after accepting the recommendation is regarded as the preferred music of the user according to the present embodiment. In view of the above, information related to the preferred music, for example, according to the present embodiment, the metadata is accumulated as reproduction history information in the history accumulation unit $26_1$.

It should be noted that the reproduction history information accumulated in the history accumulation unit $26_1$ is not limited to the music listened to by the user after accepting the recommendation from the music recommendation server $12_1$. For example, a history related to the reproduced musics from reproduction of a ripped music, reproduction of a music obtained from another apparatus, and the like may be used as the reproduction history information. Therefore, the history accumulation unit $26_1$ accumulates the reproduction history information about the preferred musics listened to by the user of the client device $11_1$.

The preference extraction unit $27_1$ extracts the preference information of the user from the reproduction history information accumulated in the history accumulation unit $26_1$ as a preference profile and accumulates the preference information in the preference profile accumulation unit $29_1$. It should be noted that an extraction method for the preference information of the user is not particularly limited and, for example, a method of content based filtering or the like may be adopted.

Also, hereinafter, for facilitating the description, the preference profile of the user who uses the client device 1 may also be referred to as UP-1. It should be noted that according to the present embodiment, the profile means a preference model and a model characterizing the individual user, which are extracted from the reproduction history information of the user.

On the other hand, in the initial registration unit $28_1$, the preference information of the same or different user provided from another apparatus is registered as initial registration data. The preference extraction unit $27_1$ extracts the preference information of the user from the initial registration data registered in the initial registration unit $28_1$ and accumulates the preference information in the preference profile accumulation unit $29_1$.

The client device $11_1$ is configured in the above-described manner.

The music recommendation server $12_1$ is composed, for example, of a dedicated use server or the like. In response to a demand from the client device $11_1$, the music recommendation server $12_1$ is adapted to recommend the music in accordance with the preference of the user of the client device $11_1$.

The music recommendation server $12_1$ is composed by including a communication unit $31_1$, a music recommendation engine $32_1$, a music item database $33_1$, and a music registration ID management unit $34_1$.

The communication unit $31_1$ performs a communication with another device such as the client device $11_1$.

In the music item database $33_1$, a plurality of downloadable musics are accumulated while being associated with metadata thereof.

It should be noted that according to the present embodiment, as the music recommendation server $12_1$ carries out the music download service itself, the actual data of the downloadable music itself is also accumulated in the music item database $33_1$. In other words, the music download service is carried out by another server, and in a case where the music recommendation server $12_1$ only carries out the music recommendation, it is possible to accumulate only the metadata of the music in the music item database $33_1$.

In addition, hereinafter, for simplicity of the description, unless otherwise noted, in a case where a situation that the music is transferred is described, together with the actual data of the music, it is meant that the metadata thereof is also transferred.

The music recommendation engine $32_1$ is adapted to select the recommended music to be recommended to the user of the client device $11_1$ from the plurality of musics accumulated in the music item database $33_1$ and provide the recommended music to the client device $11_1$ via the communication unit $31_1$. For this reason, the music recommendation engine $32_1$ has a similarity computation unit $32A_1$.

The similarity computation unit $32A_1$ is adapted to select a music similar to the preference profile (UP-1) sent from the client device $11_1$, that is, a music similar to the preferred music of the user of the client device $11_1$ as a candidate of the recommended music (hereinafter, referred to as the recommended music candidate). It should be noted that a similarity computation method for the similarity computation unit $32A_1$ is not particularly limited and, for example, such a method can be adopted that the metadata of the respective musics is subjected to vector conversion and the similarity is computed on the basis of a cosign distance between the respective vectors.

The music registration ID management unit $34_1$ is adapted to perform a processing related to an ID for uniquely identifying the music.

Herein, as the ID for uniquely identifying the music, two types of the ID exist including a standard ID which is a common ID standardized in a plurality of download services and an independent ID which is an ID independently assigned in a particular download service. That is, in the service assigning the independent ID (hereinafter, referred to as independent ID system), when an ID is assigning to a certain music, an independent ID is registered which is different from a service where a standard ID is assigned when an ID is assigning to a certain music (hereinafter, referred to as standard ID system). Thus, even in the case of the same music, the IDs are different from each other.

For example, in a case where the music recommendation server $12_1$ provides the music download service based on the independent ID system, the music accumulated in the music item database $33_1$ is assigned with the independent ID. In a case where the music registration ID management unit $34_1$ receives an inquiry about an independent ID corresponding to a standard ID of a certain music from the client device $11_1$, for example, a text fuzzy search processing is executed on the music accumulated in the music item database $33_1$ by using information such as a title text of the music to perform a processing of translating (converting) the standard ID into the independent ID.

In addition, when a new music is registered in the music item database $33_1$, the music registration ID management unit $34_1$ assigns an ID to the music. That is, the music registration ID management unit $34_1$ assigns a standard ID to the new music in the case of the standard ID system, and assigns an independent ID to the new music in the case of the independent ID system.

The music recommendation server $12_1$ is configured in the above-described manner.

Similarly to the client device $11_1$, the client device $11_2$ presents the user the music recommended from the music recommendation server $12_2$ receiving the music download service, and in a case where the user issues an instruction of listening to the music, the client device $11_2$ reproduces the recommended music.

In the client device $11_2$, the configurations of a control unit $21_2$ to a preference profile accumulation unit $29_2$ are similar to the configurations of the control unit $21_1$ to the preference profile accumulation unit $29_1$ in the client device $11_1$, and therefore a description thereof will be omitted. It should be noted that a preference profile of a user who uses the client device $11_2$ is hereinafter referred to as UP-2 for a purpose of distinguishing from the above-described UP-1 in the description.

It should be noted that in the example of FIG. 1, two client devices including the client device $11_1$ and the client device $11_2$ are illustrated in the drawing, but the configuration is not limited to the example of FIG. 1. Thus, it is also possible to provide still more client devices $11_n$ (n is a natural number). In actuality, as a large number of users exist and there are also various types of contents to be dealt with, it is assumed that a large number of client devices exist. Also, in particular, in a case where the distinction of the client devices $11_1$ to $11_n$ does not make any particular difference, simply, the collective term, the client device 11, is used for the description.

Similarly to the music recommendation server $12_1$, the music recommendation server $12_2$ distributes the recommended music to the client device $11_2$ receiving the music download service from the music recommendation server $12_2$.

In the music recommendation server $12_2$, the configurations of a communication unit $31_2$ to a music registration ID management unit $34_2$ are similar to the configurations of the communication unit $31_1$ to the music registration ID management unit $34_1$ in the music recommendation server $12_1$, and therefore a description thereof will be omitted.

It should be noted that in the example of FIG. 1, two music recommendation servers of the music recommendation server $12_1$ and the music recommendation server $12_2$ are illustrated, but the configuration is not limited to the example of FIG. 1. Thus, it is also possible to provide still more music recommendation servers $12_n$ (n is a natural number). Also, in particular, in a case where the distinction of the music recommendation servers $12_1$ to $12_n$ does not make any particular difference, simply, the collective term, the music recommendation server 12, is used for the description.

Furthermore, for the sake of description, a service received by the client device $11_1$ which is a music download service provided by the music recommendation server $12_1$ is referred to as service $S_1$, and a service received by the client device $11_2$ which is a music download service provided by the music recommendation server $12_2$ is referred to as service $S_2$ for the following description.

The broker server 13 is composed, for example, of a dedicated-use server or the like. The broker server 13 is adapted to identify the music in accordance with the inquiry from the client device 11 to be associated with the standard ID.

The broker server 13 is composed by including a control unit 41, a communication unit 42, an ID mapping database 43, a music registration ID management unit 44, and a log mining unit 45.

The control unit 41 is adapted to control the operation of the respective units in the broker server 13.

While following the control of the control unit 41, the communication unit 42 performs a communication with another device such as the client device 11.

In the ID mapping database 43, information related to the plurality of musics is structured on the basis of the standard ID system. In accordance with the inquiry from the client device 11, the music registration ID management unit 44 refers to the ID mapping database 43 to perform a processing for identifying the music, for example, a text analysis, a characteristic analysis, fingerprinting, 12-tone analysis, or the like, and associates the standard ID to the identified music.

In addition, the ID mapping database 43 also accumulates various histories such as an access history related to the processing executed in accordance with the inquiry from the client device 11. The log mining unit 45 is adapted to perform a processing of analyzing the histories accumulated in the ID mapping database 43.

It should be noted that when the standard ID and the metadata are accumulated in the ID mapping database 43 while being associated with each other, the music registration ID management unit 44 can also identify the music while referring to the metadata.

The broker server 13 is configured in the above-described manner.

It should be noted that in the example of FIG. 1, for simplicity of the description, the drawing illustrates as if the respective devices directly exchange data with each other, but in actuality, in addition to the direct data exchange in the respective devices, a communication may of course be performed among the respective devices via the internet or another network. Also, in the case of the direct data exchange in the respective devices, for example, a dedicated-use drive is attached, and a removal medium composed of an optical disc, a semiconductor memory, or the like may also be utilized.

In addition, the server constructing the content recommendation system 1 is only the music recommendation server 12 and the broker server 13 in the example of FIG. 1, but the configuration is not limited to the example of FIG. 1, and another server in accordance with a usage of the content recommendation system 1 and characteristic information which will be described below can also be adopted.

The content recommendation system 1 is configured in the above-described manner.

In the above-described content recommendation system 1, in a case where the preference information of the user is shared between the client device $11_1$ and the client device $11_2$, the sharing method is varied depending on whether an ID system of the music (content) is the standard ID system or the independent ID system. That is, the sharing method of the preference information is varied depending on a first case in which both the service $S_1$ and the service $S_2$ are in conformity to the standard ID system, a second case in which the service $S_2$ is based on the independent ID system, a third case in which the service $S_1$ is based on the independent ID system, or a fourth case in which both the service $S_1$ and the service $S_2$ are based on the independent ID system.

In view of the above, first, with reference to FIGS. 2 to 4, a description will be given of the sharing processing for the preference information performed in the content recommendation system 1 in the above-described first case, that is, in a case where both the service $S_1$ and the service $S_2$ are in conformity to the standard ID system.

It should be noted that in the first case, the client device $11_1$ and the client device $11_2$ are terminals used by the same user. Therefore, by executing the above-described sharing processing, the preference information is shared by the terminals used by the same user. Also, in the following description regarding the first case, it is presumed that the client device $11_2$ can receive the service $S_2$ provided by the music recommendation server $12_2$, but the service is not yet utilized and no logs such as the reproduction history information exist, so that a recommendation of a music is not yet received.

Herein, first, with reference to the flowchart of FIG. 2, in the first case, a description will be given of the sharing processing for the preference information executed by the client device $11_1$, the music recommendation server $12_1$, and the broker server 13, and, with reference to the flowchart of FIG. 4, a description will be given of the sharing processing for the preference information executed in the client device $11_2$ and the music recommendation server $12_2$. That is, the processing illustrated in the flowcharts of FIGS. 2 and 4 is a processing executed for allowing the preference profile (UP-1) constructed in the client device $11_1$ to be utilized also in the client device $11_2$.

In the client device $11_1$, in step S11, the preference extraction unit $27_1$ extracts preference information of the user who uses the client device $11_1$ from the reproduction history information accumulated in the history accumulation unit $26_1$ to generate the preference profile (UP-1) and saves the preference profile (UP-1) in the preference profile accumulation unit $29_1$.

In step S12, the communication unit $23_1$ sends the preference profile (UP-1) accumulated in the preference profile accumulation unit $29_1$ to the music recommendation server $12_1$. After that, the music recommendation server $12_1$ executes the following processing.

In step S21, the communication unit $31_1$ receives the preference profile (UP-1) sent from the client device $11_1$.

In step S22, on the basis of the received preference profile (UP-1), the similarity computation unit $32A_1$ selects a music similar to the preferred music of the user of the client device $11_1$ as the recommended music candidate. In step S23, on the basis of the computation result of the similarity, the music recommendation engine $32_1$ selects a music having a high similarity from among the recommended music candidates (close to the preference of the user) to generate a recommended music list. To elaborate, the recommended music list includes one or a plurality of musics to be recommended to the user, which are the musics similar to the preferred music of the user of the client device $11_1$ selected from among the recommended music candidates.

In step S23, the communication unit $31_1$ sends the thus generated recommended music list to the client device $11_1$.

Then, when the recommended music list is sent the music recommendation server $12_1$, in the client device $11_1$, in step S13, the communication unit $23_1$ receives the recommended music list. With this configuration, the client device $11_1$ has received the recommended music list in accordance with the preference profile (UP-1).

In step S14, the control unit $21_1$ generates a list in which the recommended music list is represented in a format of an ID sequence (hereinafter, referred to as recommended music ID list). In step S15, the communication unit $23_1$ sends the recommended music ID list to the broker server 13.

Figure 3:
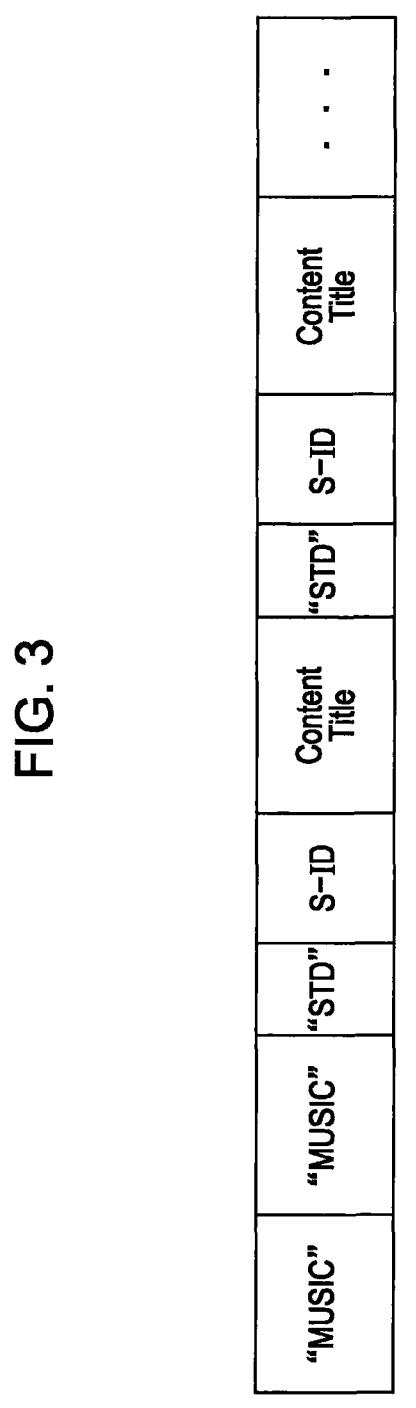

Herein, FIG. 3 illustrates the example of the schema for the recommended music ID list.

As illustrated in the example of FIG. 3, at the head of the recommended music ID list, a type of a demanded content denoted by "MUSIC" is arranged. Next to the content type, a code indicating a type of the content as a header of the list denoted by "MUSIC" is arranged. To elaborate, in the example of FIG. 3, both the type of the demanded content and the type of the actual content are "MUSIC" which represents the music. It should be noted that in the content type, a general noun such as "MUSIC" illustrated in the example of FIG. 3 or "MOVIE" is preferably input with ASCII code.

Next to the content type, 1 bit of "STD" indicating that the ID is in conformity to the standard system is arranged. Next to the "STD", an ID of the content is arranged. Following the ID of the content, a title of the content is arranged. In FIG. 3, the ID of the content is denoted by "S-ID", and the content is denoted by "Content Title".

Subsequently, next to the "Content Title", a combination of "STD", "S-ID", and "Content Title" is arranged again. That is, in the recommended music ID list, the combination of "STD", "S-ID", and "Content Title" is repeatedly arranged by the number of the contents to be recommended.

The recommended music ID list structured in the above-described manner is described, for example, in XML (extensible markup language) which is a markup language, or the like.

It should be noted that according to the present embodiment, the description has been given in which the client device 1 generates the recommended music ID list, but in a case where the recommended music list sent from the music recommendation server $12_1$ is already formed as the ID sequence illustrated in FIG. 3, the recommended music list may be transferred to the recommended music ID list as it is.

Figure 2:
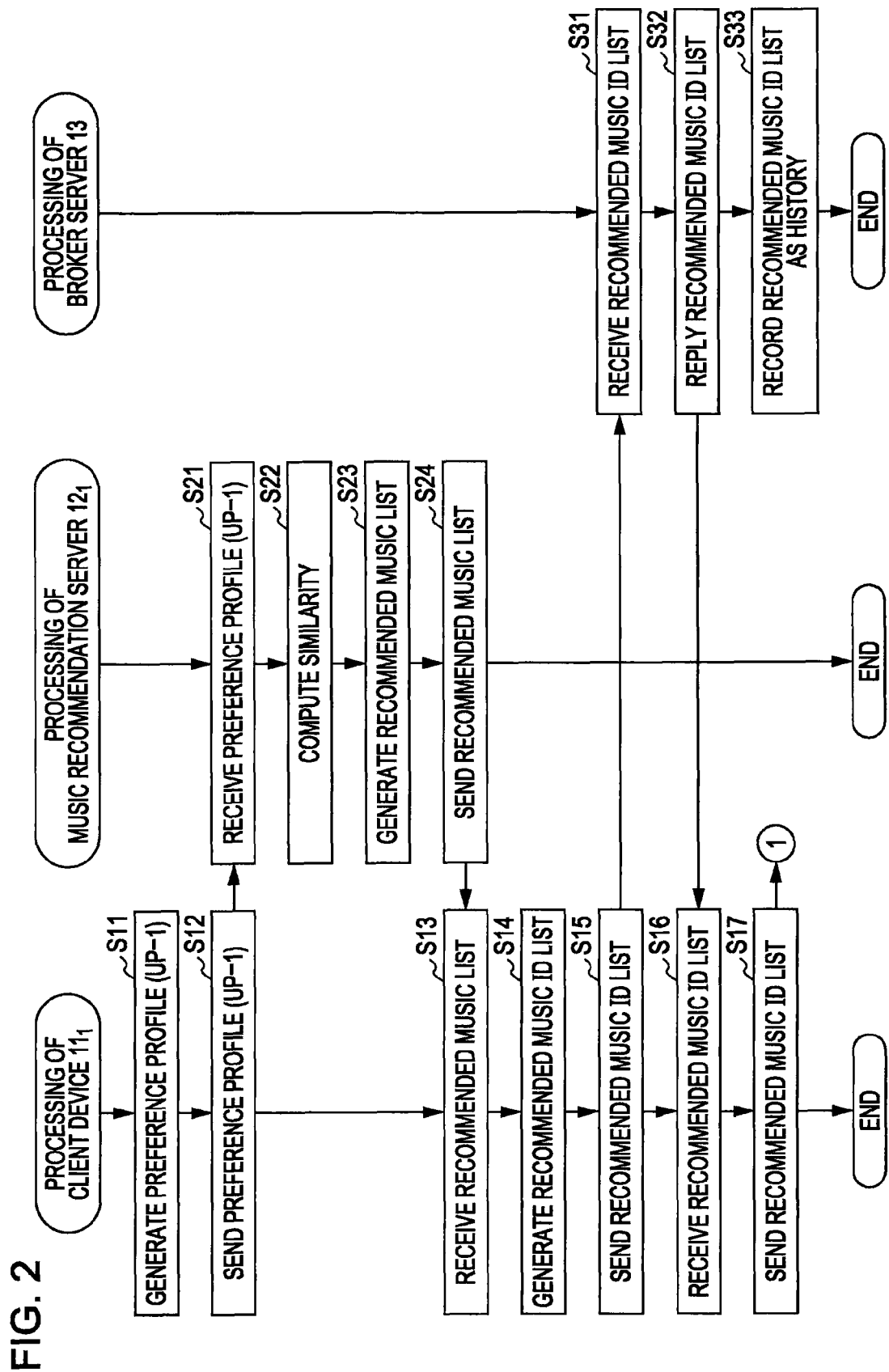
FIG. 2 is a flowchart for describing a preference information sharing processing in a first case.

While returning to the flowchart of FIG. 2, when the recommended music ID list is sent from the client device $11_1$, in the broker server 13, in step S31, the communication unit 42 receives the recommended music ID list. Herein, in the first case, both the client device $11_1$ and the client device $11_2$ are in conformity to the standard ID system, the ID is not subjected to the mapping. In view of the above, in step S32, while following the control of the control unit 41, the communication unit 42 replies the recommended music ID list in which the ID is confirmed to be the standard ID to the client device $11_1$ as it is.

In step S33, the control unit 41 records the recommended music ID list received from the client device $11_1$ in the ID mapping database 43 as the history. With this configuration, the broker server 13 operates, for example, the CF method or the like, so that it is possible to perform the original recommendation to the client device 11. It should be noted that a detail of the recommendation performed by the broker server 13 will be described below.

Meanwhile, when the recommended music ID list is replied from the broker server 13, in the client device $11_1$, in step S16, the communication unit $23_1$ receives the recommended music ID list from the broker server 13. In step S17, the recommended music ID list is sent to the client device $11_2$ where the preference information is shared.

Figure 4:
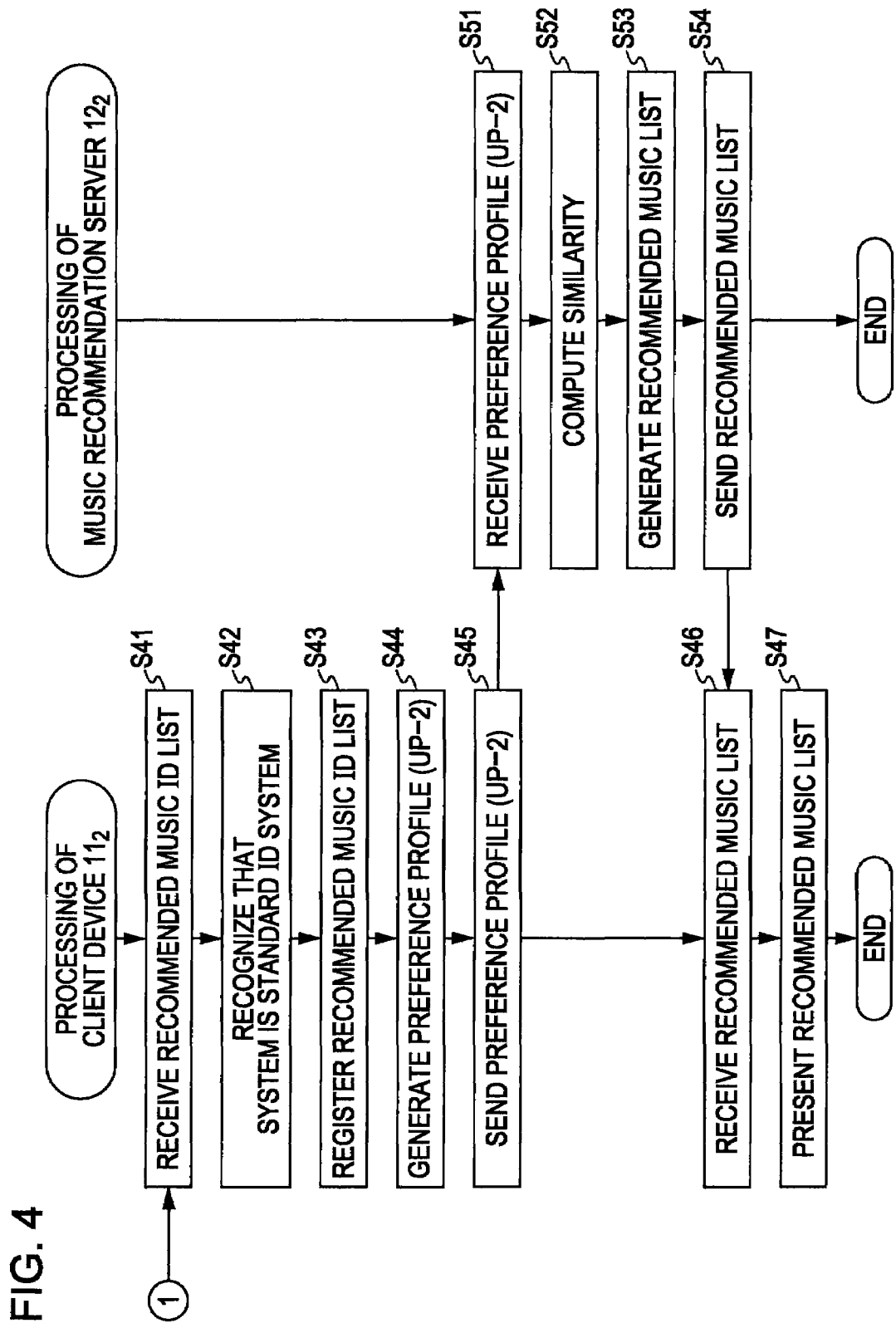
FIG. 4 is a flowchart for describing the preference information sharing processing in the first case.

In the flowchart of FIG. 2, the recommended music ID list sent from the client device $11_1$ is received by the client device $11_2$ as illustrated in the flowchart of FIG. 4. That is, in step S41, a communication unit $23_2$ receives the recommended music ID list sent from the client device $11_1$.

In step S42, the control unit $21_2$ refers to the "STD" of the received recommended music ID list (FIG. 3) to recognize that the control unit $21_2$ is in conformity to the standard ID system (in the first case, as both the service $S_1$ and the service $S_2$ are in conformity to the standard ID system, and it is determined that the control unit $21_2$ is in conformity to the standard ID system), in step S43, the received recommended music ID list is registered in an initial registration unit $28_2$.

Subsequently, in step S44, a preference extraction unit $27_2$ extracts the preference information of the user who uses the client device $11_1$ from the recommended music ID list registered in the initial registration unit $28_2$ and accumulates the preference information as the preference profile (UP-2) in the preference profile accumulation unit $29_2$.

In step S45, the communication unit $23_2$ sends the preference profile (UP-2) accumulated in the preference profile accumulation unit $29_2$ to the music recommendation server $12_2$. After that, in the music recommendation server $12_2$, similarly to the music recommendation server $12_1$ receiving the preference profile (UP-1) from the client device $11_1$, the processing of generating the recommended music list based on the preference profile (UP-2) is performed.

In other words, in steps S51 to S54 of FIG. 4, similarly to the processing in steps S21 to S24 of FIG. 2, the recommended music list based on the preference profile (UP-2) from the client device $11_2$ is generated to be sent to the client device $11_2$.

Then, when the recommended music list is sent, in the client device $11_2$, in step S46, the communication unit $23_2$ the recommended music list receives the recommended music list sent from the music recommendation server $12_2$. In step S47, a recommendation presentation unit $24_2$ presents the received recommended music list to the user. With this configuration, in the client device $11_2$ as well, it is possible to receive the recommendation of the music based on the preference information of the user who uses the client device $11_1$ from the music recommendation server $12_2$.

As described above, in a case where the services in which the preference information is shared are both in conformity to the standard ID system, the recommended music ID list can be sent as it is without the mapping. Thus, in the device on the reception side where the recommended music ID list is received, by generating the preference profile on the basis of the received recommended music ID list, it is possible to receive the recommendation from the server which recommends the music.

It should be noted that in the above-described first case, the description has been given in which before the recommended music ID list is sent to the client device $11_2$, the client device $11_1$ sends the recommended music ID list to the broker server 13 too (the processing in step S15, step S16, and steps S31 to S33 of FIG. 2). However, it is also possible to adopt a simplified configuration in which the recommended music ID list is not sent to the broker server 13. In that case, the history of the recommended music ID list is not accumulated in the broker server 13, but the sharing of the preference information between the client devices can be realized.

Next, with reference to the flowchart of FIG. 5, a description will be given of the sharing processing for the preference information performed in the content recommendation system 1 in the above-described second case, that is, in a case where the service $S_2$ is based on the independent ID system.

It should be noted that in a case where the service $S_2$ is based on the independent ID system, the service $S_1$ is in conformity to the standard ID system. The respective processings executed by the client device $11_1$, the music recommendation server $12_1$, and the broker server 13 are similar to the processings described in the flowchart of FIG. 2, and therefore a description thereof will be omitted. To elaborate, the following description of the second case is for a processing after the processing for sending the recommended music ID list by the client device $11_1$ (the processing in step S17 of FIG. 2).

Figure 5:
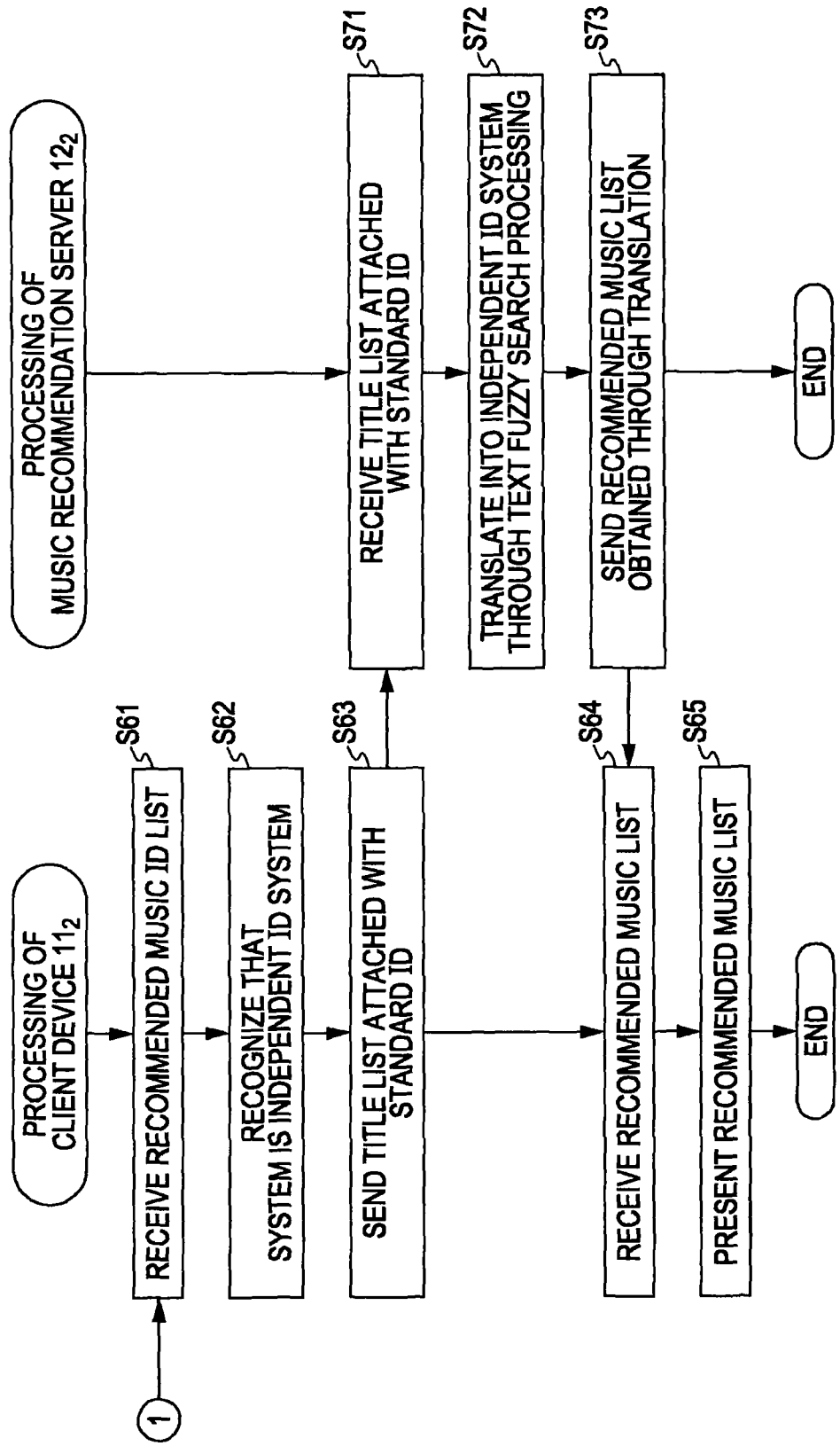
FIG. 5 is a flowchart for describing a preference information sharing processing in a second case.

That is, as illustrated in the flowchart of FIG. 5, when the recommended music ID list is sent from the client device $11_1$, in the client device $11_2$, in step S61, the communication unit $23_2$ receives the recommended music ID list from the client device $11_1$.

In step S62, the control unit $21_2$ refers to the "STD" of the recommended music ID list (FIG. 3) to recognize that the control unit $21_1$ is based on the independent ID system (in the second case, as the service $S_2$ is based on the independent ID system, it is determined that the control unit $21_1$ is based on the independent ID system). In step S63, while following the control of the control unit $21_2$, the communication unit $23_2$ sends a standard ID and a title text list (hereinafter, referred to as title list attached with standard ID) to the music recommendation server $12_2$. In the example of FIG. 3, "S-ID" and "Content Title" are sent to the music recommendation server $12_2$.

When the title list attached with the standard ID is sent from the client device $11_2$, in the music recommendation server $12_2$, in step S71, the communication unit $31_2$ receives the title list attached with the standard ID.

In step S72, the music registration ID management unit $34_2$ uses the received title text list attached with the standard ID to execute the text fuzzy search processing or the like on musics accumulated in a music item database $33_2$. Thus, the standard ID received from the client device $11_1$ is translated into an independent ID used in the service provided by the music recommendation server $12_2$. It should be noted that this translation processing is not limited to the text fuzzy search processing but may of course be another processing with which the music and the ID can be identified. For example, as the recommended music ID list itself is received from the client device $11_2$, the music registration ID management unit $34_2$ applies a predetermined signal processing on the list to identify the music and can translate the ID into its own independent ID.

In step S73, the communication unit $23_2$ sends the recommended music list obtained through the translation to the client device $11_1$.

After that, in the client device $11_2$, in step S64, the communication unit $23_2$ receives the recommended music list sent from the music recommendation server $12_2$, and in step S65, the recommendation presentation unit $24_2$ presents the received recommended music list to the user. With this configuration, in the client device $11_2$ as well where the recommendation of the music is received in the independent ID system which is different from the standard ID system, it is possible to receive the recommendation of the music based on the preference information of the user who uses the client device $11_1$ from the music recommendation server $12_2$.

As described above, in a case where the device at the sharing destination of the preference information is based on the independent ID system, by translating the standard ID system into the independent ID system on the reception side, it is possible receive the recommendation from the server which recommends the music.

Next, with reference to the flowchart of FIG. 6, a description will be given of the sharing processing for the preference information performed in the content recommendation system 1 in the above-described third case, that is, in a case where the service $S_1$ is based on the independent ID system.

Figure 6:
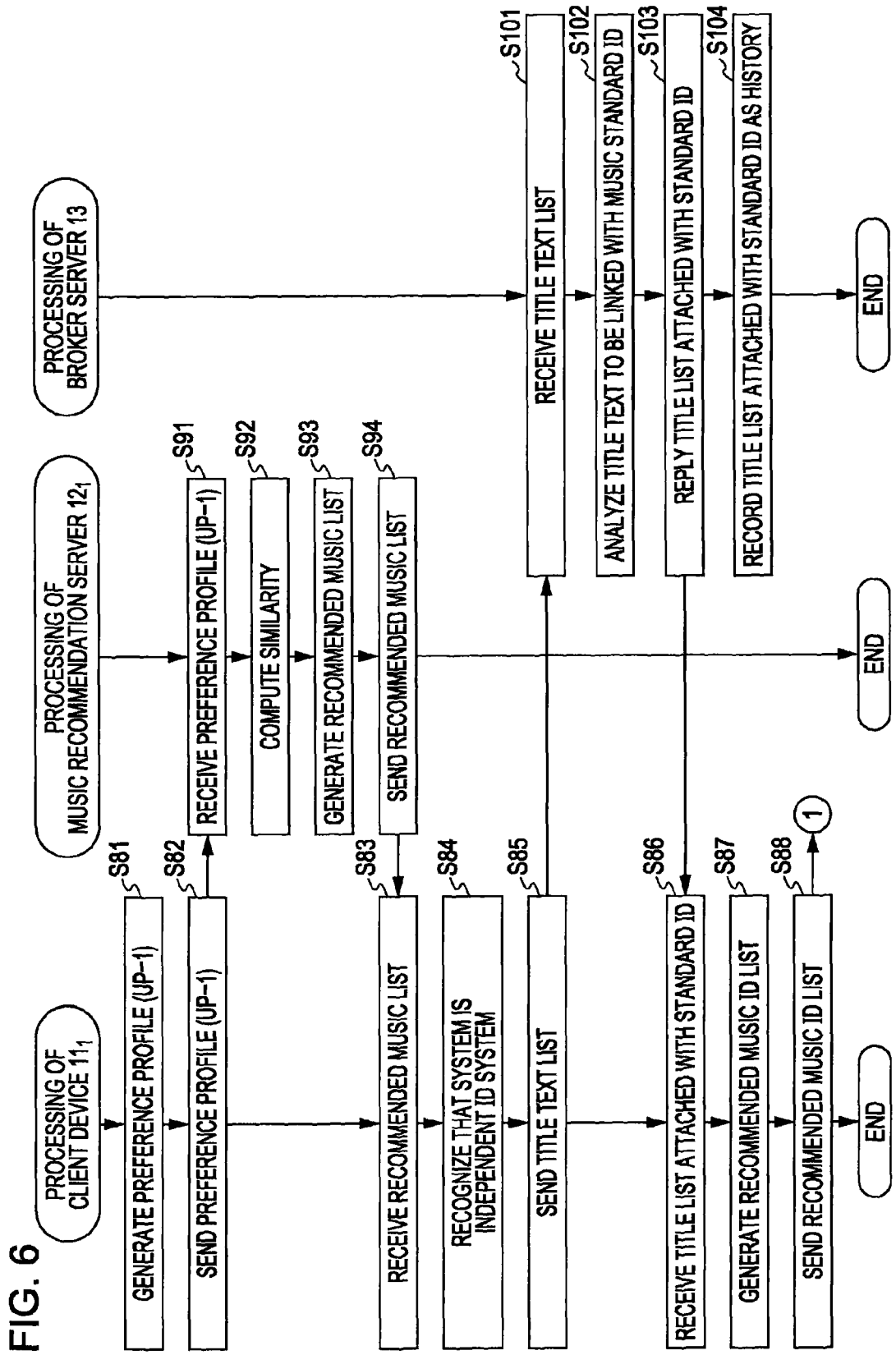
FIG. 6 is a flowchart for describing a preference information sharing processing in a third case.

It should be noted that in FIG. 6, the processing in steps S81 to S83 executed by the client device $11_1$ and the processing in steps S91 to S94 executed by the music recommendation server $12_1$ are respectively similar to the processing in steps S11 to S13 of FIG. 2 and the processing in step S21 to S24 of FIG. 2, and therefore a description thereof will be omitted.

Therefore, after that, in the client device $11_1$, the recommended music list is received from the music recommendation server $12_1$. Then, in step S84, for example, on the basis of the received recommended music list or the like, the control unit $21_1$ recognizes that the control unit $21_1$ is based on the independent ID system (in the case of the third case, as the service $S_1$ is based on the independent ID system, it is determined that the control unit $21_1$ is based on the independent ID system).

In step S85, while following the control of the control unit $21_1$, the communication unit $23_1$ sends the title text list of the music based on the recommended music list to the broker server 13. It should be noted that the client device $11_1$ may perform an inquiry to the broker server 13 by sending the text of the title or the like or sending information of a part of the music or other information.

After that, in the broker server 13, in step S101, the communication unit 42 receives the title text list from the client device 11₁. In step S102, the music registration ID management unit 44 applies a predetermined text analysis processing on the received title text list to identify the music to be associated with the standard ID of the music.

In step S103, while following the control of the control unit 41, the communication unit 42 replies the title list attached with the standard ID which is the title text list associated with the standard ID to the client device 11₁.

In step S104, the control unit 41 records the title list attached with the standard ID as a history in the ID mapping database 43. With this configuration, in a case where the music recommendation server 12₁ and the client device 11₁ are operated on the basis of the independent ID system, on the broker server 13 side, each time the mapping with the standard ID is performed, the title list attached with the standard ID can be accumulated. Thus, for example, when the same inquiry is received next time, the broker server 13 can promptly reply the title list attached with the standard ID without repeating the similar analysis processing.

Meanwhile, when the title list attached with the standard ID is sent from the broker server 13, in the client device 11₁, in step S86, the communication unit 23₁ receives the title list attached with the standard ID.

In step S87, the control unit 21₁ generates the recommended music ID list on the basis of the received title list attached with the standard ID. In step S88, the communication unit 23₁ sends the recommended music ID list to the client device 11₂. It should be noted that as described above, in a case where the title list attached with the standard ID sent from the broker server 13 is already formed as the ID sequence illustrated in already formed as the ID sequence illustrated in FIG. 3, the title list attached with the standard ID may be transferred as the recommended music ID list as it is.

After that, in the client device 11₂ which receives the recommended music ID list sent from the client device 11₁, in a case where the service is in conformity to the standard ID system, the similar processing to that in the first case is performed. That is, as illustrated in the flowchart of FIG. 4, for example, the client device 11₂ generates the preference profile (UP-2) and presents the recommended music list generated on the basis of the preference profile (UP-2).

As described above, in a case where the service S₁ is based on the independent ID system, before the recommended music ID list is sent to the client device 11₂, the inquiry is made to the broker server 13 and the independent ID system is translated into the standard ID system for the sending. Thus, on the service S₂ side, it is possible to receive the list in conformity to the standard ID system.

Finally, a description will be given of the sharing processing for the preference information performed in the content recommendation system 1 in the above-described fourth case, that is, in a case where both the service S₁ and the service S₂ are based on the independent ID system.

It should be noted that in a case where both the service S₁ and the service S₂ are based on the independent ID system, the respective processings executed in the client device 11₁, the music recommendation server 12₁, and the broker server 13 are similar to the processings described in the flowchart of FIG. 6, and the respective processings executed in the client device 11₂ and the music recommendation server 12₂ are similar to the processings described in the flowchart of FIG. 5.

That is, as described above with reference to FIG. 6, by making the inquiry to the broker server 13, the client device 11₁ generates the recommended music ID list to be sent to the client device 11₂. After that, as described above with reference to FIG. 5, by sending the title list attached with the standard ID to the music recommendation server 12₂, the client device 11₂ can obtain the recommended music list.

As described above, in a case where both the service S₁ and the service S₂ are based on the independent ID system, on the service S₁ side, the client device 11₁ makes the inquiry to the broker server 13 to translate the independent ID system of the service S₁ into the standard ID system and then sends the recommended music ID list. On the service S₂ side, the client device 11₂ receives the recommended music ID list and makes the inquiry to the music recommendation server 12₂, so that it is possible to present the recommended music list which is based on the independent ID system of the service S₂.

In this manner, in the first to fourth cases, the service S₁ and the service S₂ belong to either of the ID systems including the independent ID system or the standard ID system. According to the present embodiment, by absorbing the difference of these ID systems, irrespective of the ID systems, it is possible for another device to utilize the preference information with respect to the music obtained in a certain device. To elaborate, in any of the first to fourth cases, it is possible to realize the system without a strict specification for the metadata or the profile, thus, in such a format that the analysis and the usage method of the independent device are accepted.

Incidentally, the above-described first to fourth cases, the example in which the contents are of the same type, that is, the contents of the same type are shared between the devices, has been described. However, the contents are not limited to the same type but, for example, contents of different types such as a music and a movie can also be shared between the devices. In view of the above, the example of sharing the contents of the different types will be described as a fifth case below.

Figure 7:
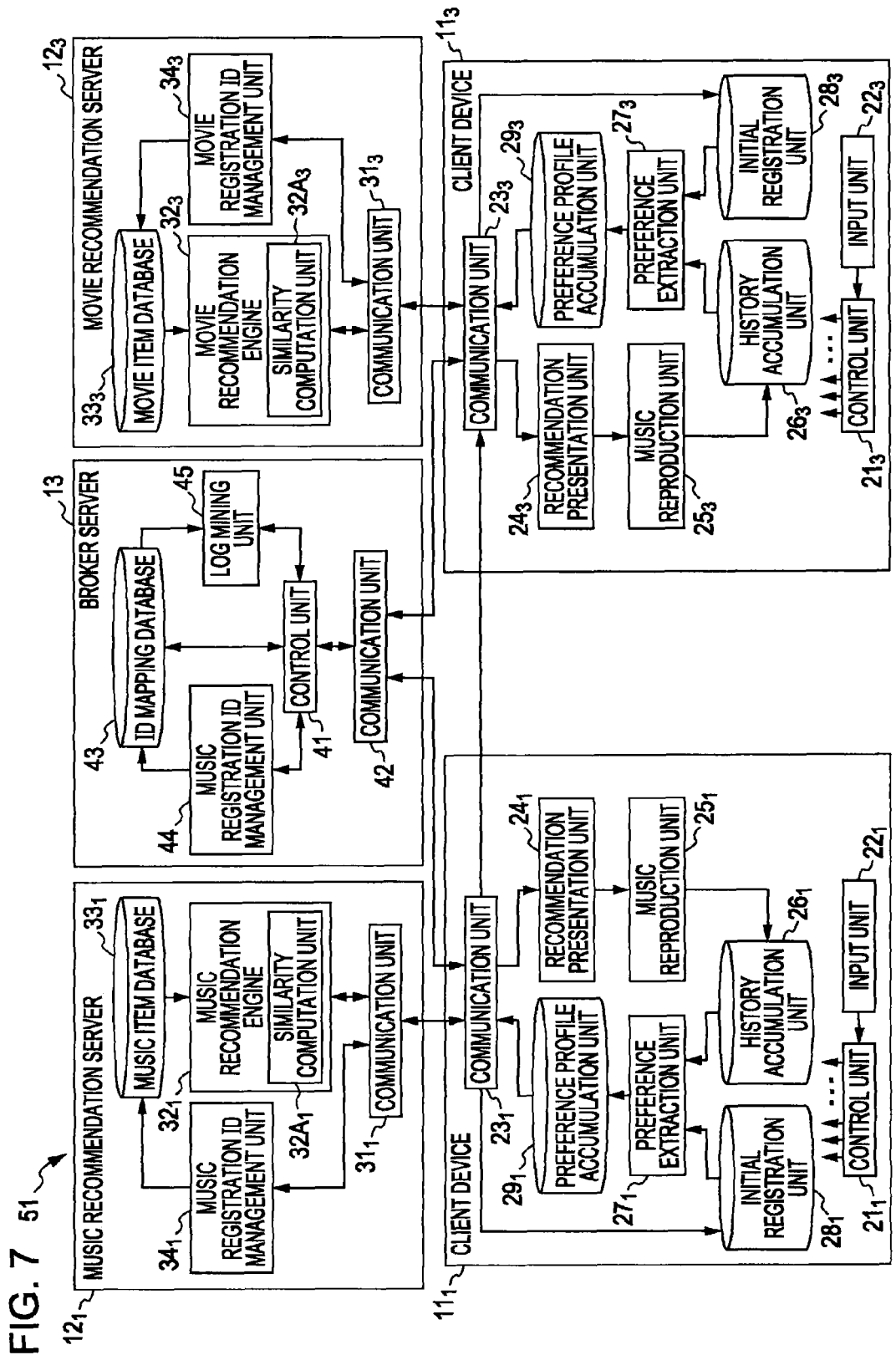
FIG. 7 is a block diagram of a configuration of a content recommendation system according to an embodiment of the present invention.

FIG. 7 is a block diagram of another configuration of a content recommendation system according to an embodiment of the present invention.

In a content recommendation system 51 of FIG. 7, components similar to those in FIG. 1 are allocated with the same reference numerals, and a description of the same processing will be omitted to avoid the repetition. That is, in this example, instead of the client device 11₂ and the music recommendation server 12₂ in FIG. 1, a client device 11₃ and a movie recommendation server 12₃ are provided. Also, the client device 11₃ receives a movie download service (hereinafter, referred to as service S3) provided by the movie recommendation server 12₃.

In the client device 11₃, components except for a movie reproduction unit 25₃ have similar configurations to those in the client device 11₁ and the client device 11₂ in FIG. 1. In a case where an instruction is issued of viewing a movie to be recommended to a user of the client device 11₃ (hereinafter, referred to as recommended movie) which is presented by a recommendation presentation unit 24₃, the movie reproduction unit 25₃ is adapted to reproduce the instructed movie.

That is, as compared with the client device 11₁ and the like in FIG. 1, the client device 11₃ has a similar function to that of the client device 11₁ or the like in FIG. 1 except for a point in which the movie is reproduced instead of the music. It should be noted that a preference profile of the user who uses the client device 11₃ is referred to as UP-3 for the sake of being distinguished from the above-described UP-1 and UP-2 in the following description.

On the other hand, the movie recommendation server 12₃ is composed by including a communication unit 31₃, a movie reproduction engine 32₃, a movie item database 33₃, and a movie registration ID management unit 34₃. As compared with the music recommendation server 12₁ and the music recommendation server $12_2$ in FIG. 1, the movie recommendation server $12_3$ has a similar function to that of the music recommendation server $12_1$ or the like in FIG. 1 except for a point in which the movie is recommended instead of the music.

That is, the movie reproduction engine $32_3$ is adapted to select a recommended movie to be recommended to the user of the client device $11_3$ from a plurality of movies accumulated in the movie item database $33_3$ and provide the recommended movie via the communication unit $31_3$ to the client device $11_3$. For this reason, the movie reproduction engine $32_3$ has a similarity computation unit $32A_3$. Also, the movie registration ID management unit $34_3$ is adapted to perform a processing related to an ID for uniquely identifying the movie.

In addition, the broker server 13 basically has a similar configuration to that of the broker server 13 in FIG. 1, but the ID mapping database 43 in FIG. 7 also accumulates a music-movie preference correspondence map.

Herein, the music-movie preference correspondence map means a list in which the preference information of the music is in correspondence with the preference information of the movie. Therefore, by referring to this music-movie preference correspondence map, the control unit 41 can generate a list in which the recommendation movie list is formed in an ID sequence (hereinafter, referred to as recommended movie ID list) from the recommended music ID list. It should be noted that the music-movie preference correspondence map may be, for example, prepared in advance, or different type pattern recommendation lists are sent from a large number of users. Therefore, the information based on the log may be sequentially reinforced by way of so-called mining. At that time, grouping (clustering) for each of the different type users can be performed.

The content recommendation system 51 is configured in the above-described manner.

Next, with reference to a flowchart of FIG. 8, a processing performed in the content recommendation system 51 in the fifth case, that is, a processing for sharing different types of the contents will be described.

It should be noted that in the flowchart of FIG. 8, as an example of the processing performed in the respective devices when the different types of the contents are shared, a description will be given of a processing performed when the recommended music ID list is sent from the client device $11_1$ instead of the recommended movie ID list even in a case where the recommended movie ID list is demanded on the client device $11_3$ side. Therefore, the flowchart of FIG. 8 is performed after the above-described first case (the processing in step S17 of FIG. 2) or after the recommended music ID list is sent by the client device $11_1$ in the third case (the processing in step S88 of FIG. 6). Also, in the following description in the fifth case, the client device $11_3$ receives the service S3 provided by the movie recommendation server $12_3$, but the service is not yet utilized and no logs such as the reproduction history information exist, so that a recommendation of a movie is not yet received.

Figure 8:
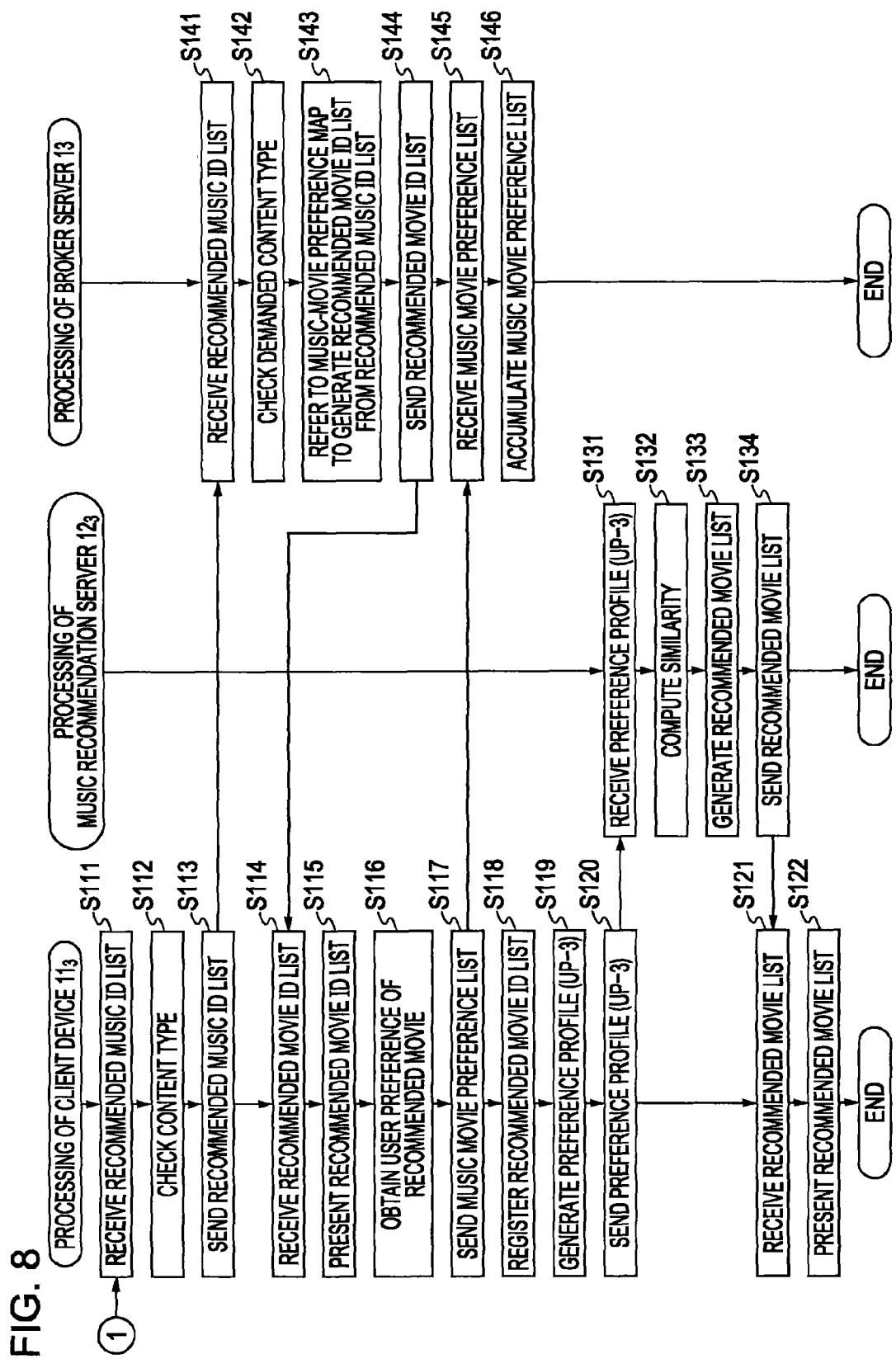
FIG. 8 is a flowchart for describing a preference information sharing processing in a fifth case.

That is, as illustrated in the flowchart of FIG. 8, when the recommended music ID list is sent from the client device $11_1$, in the client device $11_3$, in step S111, a communication unit $23_3$ receives the recommended music ID list from the client device $11_1$.

Subsequently, in step S112, a control unit $21_3$ refers to a code indicating a type of the content of the received recommended music ID list (in the example of FIG. 3, "MUSIC" arranged on the second from the left) to check the type of the content. In a case where the type of the demanded content is different, the control unit $21_3$ adds a header indicating the type of the content demanding to the recommended music ID list received from the client device $11_1$. To be more specific, even when the recommendation of a movie is desired on the client device $11_3$, the music recommendation is sent, and thus the control unit $21_3$ arranges, for example, "MOVIE" at the head of the recommended music ID list in FIG. 3, and arranges "MUSIC" next to the "MOVIE".

In step S113, the communication unit $23_3$ sends the recommended music ID list to which the header is added to the broker server 13.

When the recommended music ID list is sent from the client device $11_3$, in the broker server 13, in step S141, the communication unit 42 receives the recommended music ID list.

In step S142, the control unit 41 refers to the head of the received recommended music ID list to check the type of the content demanded by the client device $11_3$. In step S143, in a case where the "MOVIE" is arranged at the head of the recommended music ID list, the movie is demanded, the control unit 41 refers to the music-movie preference correspondence map accumulated in the ID mapping database 43 to generate the recommended movie ID list from the received recommended music ID list.

In step S144, the communication unit 42 sends the generated recommended movie ID list to the client device $11_3$.

When the recommended movie ID list is sent from the broker server 13, in the client device $11_3$, in step S114, the communication unit $23_3$ receives the recommended movie ID list.

In step S115, the recommendation presentation unit $24_3$ presents the recommended movie corresponding to the received recommended movie ID list to the user. With this configuration, in the client device $11_3$, it is possible to receive the recommendation of the movie based on the music recommended from the client device $11_1$.

At this time, the user checks the recommended movie presented in the recommendation presentation unit $24_3$ to determine whether the recommended movie is the movie wished to be watched at, and then the user can vote on this. To elaborate, in step S116, the control unit $21_3$ obtains a user's preference of the recommended movie in accordance with the operation performed on an input unit $22_3$ by the user.

In step S117, while following the control of the control unit $21_3$, the communication unit $23_3$ sends a list including an ID corresponding to the thus obtained movie the user likes and the recommended music ID list recommended from the client device $11_1$ (hereinafter, referred to as music movie preference list) to the broker server 13.

When the music movie preference list is sent from the client device $11_3$, in the broker server 13, in step S145, the communication unit 42 receives the music movie preference list.

In step S146, the control unit 41 accumulates the received music movie preference list in the music-movie preference correspondence map of the ID mapping database 43. With this configuration, in the broker server 13, different types of patters based on the feedbacks about likes and dislikes of the recommended movies from a large number of users are gathered, and it is possible to improve and refine the map by way of the minings. Also, the client device $11_3$ can receive the recommendation from the broker server 13 having the improved and refined music-movie preference correspondence map by sending the music movie preference list to the broker server 13. In a manner, it is possible to construct an intellectual growth type server in accordance with the popularity stakes of the contents.

On the other hand, in the client device $11_3$, in step S118, the received recommended movie ID list is registered in an initial registration unit $28_3$. Subsequently, in step S119, a preference extraction unit $27_3$ extracts the preference information from the recommended movie ID list registered in the initial registration unit $28_3$ and accumulates the preference information as the preference profile (UP-3) in the preference profile accumulation unit $29_3$.

In step S120, the communication unit $23_3$ sends the preference profile (UP-3) accumulated in the preference profile accumulation unit $29_3$ to the movie recommendation server $12_3$. After that, in the movie recommendation server $12_3$, similarly to the music recommendation server $12_1$ or the like having received the preference profile (UP-1) from the client device $11_1$, a processing of generating a recommended movie list based on the preference profile (UP-3) is performed.

In other words, in step S131 to S134, similarly to the processings in steps S21 to S24 in FIG. 2, the movie reproduction engine $32_3$ generates the recommended movie list based on the preference profile (UP-3) from the client device $11_3$ and the communication unit $31_3$ sends the recommended movie list to the client device $11_3$.

Then, when the recommended movie list is sent from the movie recommendation server $12_3$, in the client device $11_3$, the communication unit $23_3$ receives the recommended movie list in step S121.

In step S122, the recommendation presentation unit $24_3$ presents the received recommended movie list to the user. With this configuration, in the client device $11_3$, the recommendation of the movie based on the preference information of the user who uses the client device $11_1$ can be received from the movie recommendation server $12_3$.

As described above, in the client device $11_3$, in a case where the recommendation list of the desired type of the content is not sent, by making an inquiry to the broker server 13, the recommendation list is obtained, and it is possible to perform the sharing of the preference profile between the devices of the different types of the contents. In other words, it is possible to perform the cross-field recommendation of the different types of the contents, for example, from the music to the movie, and the like.

Incidentally, according to the present embodiment, in addition to the above-described operation, characteristic information may be exchanged between the respective devices. Herein, the characteristic information is information representing the character of the user regarding a predetermined type of the content. For example, the information is defined by an attribute such as intentionality, width, or depth. Therefore, for example, by utilizing the characteristic information representing the character of the user which is obtained in the client device $11_1$, in the other devices such as the client device $11_2$ and the client device $11_3$, it is possible to perform the recommendation of the same or different types of the contents.

FIG. 9 illustrates an example of the schema for the recommended music ID list to which the above-described characteristic information is added.

It should be noted that in FIG. 9, "MUSIC", . . . , "Content Title", . . . on the upper stage are similar to those in FIG. 3 described above, and therefore a description thereof will be omitted.

That is, in the example of FIG. 9, next to the repeatedly arranged "STD", "S-ID", and "Content Title", values attached with the attributes of the characteristic information represented by "Major", "Value", "Wide", "Value", "Deep", and "Value" are arranged. To elaborate, in FIG. 9, the intentionality is represented by "Major", and as a value of the subsequent "Value", for example, 0.32 is input. Similarly, in addition, the width is represented by "Wide", and the depth is represented by "Deep". As a value of the "Value" following the "Major" and the "Value", for example, 0.21 or 0.54 is input.

It should be noted that this characteristic information is optional information, and is not demanded information in the recommended music ID list. Therefore, in the case of the configuration where the characteristic information is arranged, these attributes are incorporated in advance so that the attributes can be processed on the device side.

As described above, by adding the characteristic information representing the character of the user to the recommended music ID list, as the characteristic information obtained from one device is utilized, the recommendation of the same or different types of the contents can be performed in the other devices.

In addition, according to the present embodiment, in a case where the service $S_1$ is in conformity to the standard ID system, before the recommended music ID list is sent to the client device $11_2$, the client device $11_1$ sends the recommended music ID list to the broker server 13 (the processing in step S15 of FIG. 2). To elaborate, in the broker server 13, the control unit 41 accumulates the recommended music ID lists sent from the respective client devices 11 in the ID mapping database 43 as the histories (the processing in step S33 of FIG. 2), and for example, the CF method is operated, so that it is possible to perform the independent recommendations to the respective devices.

For example, the control unit 41 searches the histories accumulated in the ID mapping database 43 for the recommended music ID list (R-4) from another client device $11_4$ having a similar pattern to the recommended music ID list (R-1) from the client device $11_1$ to extract a content ID which exists in the recommended music ID list (R-4) but does not exist in the recommended music ID list (R-1) to set the content ID as a recommendation target. Then, for example, when the recommended music ID list (R-1) is received from the client device $11_1$, the broker server 13 sends the recommended music ID list of FIG. 10 which will be described below to the client device $11_1$ subsequent to the above-described recommended music ID list of FIG. 9 (the processing in step S32 of FIG. 2).

FIG. 10 illustrates an example of the schema for the recommended music ID list in a case where the recommendation information of the broker server 13 is added.

It should be noted that in FIG. 10, items other than the item representing the recommendation information arranged at the head of the header are similar to those in FIG. 9 described above, and therefore a description thereof will be omitted.

That is, in the example of FIG. 10, "Recommend" indicating the recommendation from the broker server 13 is arranged at the head. In the example of FIG. 10, items arranged after this "Recommend" are similar to those in FIG. 9, for example, and the characteristic information such as the intentionality of the user is added. This characteristic information can be obtained by way of the minings from the histories accumulated in the broker server 13.

On the other hand, the client device $11_1$ which receives the recommended music ID list (FIG. 10) from the broker server 13 refers to the "Recommend" at the head and recognizes that the list is the recommendation from the broker server 13. After that, the client device 11 can present, for example, the recommendation list from the broker server 13 to the user.

In addition, as the above-described CF method can also be operated on the different types of the contents, regarding the above-described music movie preference list, the broker server 13 can send both the recommended music ID list and the recommended movie list. It should be noted that of course, a timing for the recommendation from the broker server 13 can be set as an arbitrary timing in addition to a timing when the preference profile is exchanged between the client devices 11. For example, as the respective client devices 11 sends its own recommended music ID list, the reproduction history information, or the like to the broker server 13 at an arbitrary timing, it is possible to receive the content recommendation from the broker server 13.

As described above, according to the embodiments of the present invention, the preference information of the user can be easily shared. That is, the preference information of the user regarding the content which is obtained by a certain device can also be utilized in other devices.

In addition, by providing the broker server, it is possible to perform the content recommendation only on the basis of uniqueness without providing a meaning to the content.

Furthermore, without elaborating the existing service such as the client and the server, the service can be utilized as it is, and it is possible to improve the quality of service.

It should be noted that according to the present embodiment, the music and the movie have been described as the examples of the contents, but the contents are not limited to the above. For example, the present embodiment can also be applied to other contents such as a still image such as a photograph, a motion picture such as a movie or a television program, and an electronic book such as a novel. In that case, the ID system is structured for each type of contents such as the music, the still image, the motion picture, and the electronic book.

In addition, according to the present embodiment, the example has been described in which the users of the client device $11_1$ to the client device $11_n$ are the same user, and the preference profile is exchanged between the devices of the same user, but for example, the exchange of the preference information between other users such as lovers may of course be performed. In that case, it is possible to receive a recommendation in which another person's preference is merged to the preference of the user itself, and the content can be enjoyed with another person different from the user itself. Alternatively, for example, the recommended content based on another person's preference can be enjoyed by the user alone, so that various applications can be realized depending on the minings.

Furthermore, when the preference profile is transferred to the client device $11_2$ or the client device $11_3$, the client device $11_1$ may make an inquiry to the broker server 13 after the content type demanded by the client device $11_2$ or the like is obtained in advance. At that time, by performing a header-attached list transfer between the client device $11_1$ and the client device $11_2$ or the client device $11_1$ and the client device $11_3$ in advance by way of a so-called negotiation phase, the client device 11 on the sending side can obtain the content type demanded by the client device 11 on the receiving side. With this configuration, it is possible to promptly and certainly send the list of the content demanded by the client device 11 on the receiving side.

In addition, according to the present embodiment, the example has been described in which the preference profile is generated on the client device 11 side but, for example, by sending the reproduction history information of the client device $11_1$ to the music recommendation server $12_1$, the preference profile may be generated on the music recommendation server $12_1$ side.

Incidentally, the above-described series of processings can be executed by way of hardware or can also be executed by way of software. In a case where the series of processings is executed by way of the software, a program structuring the software is installed from a program recording medium into a computer incorporated in dedicated-use hardware or a general-use computer capable of executing various functions by installing various programs, for example.

Figure 11:
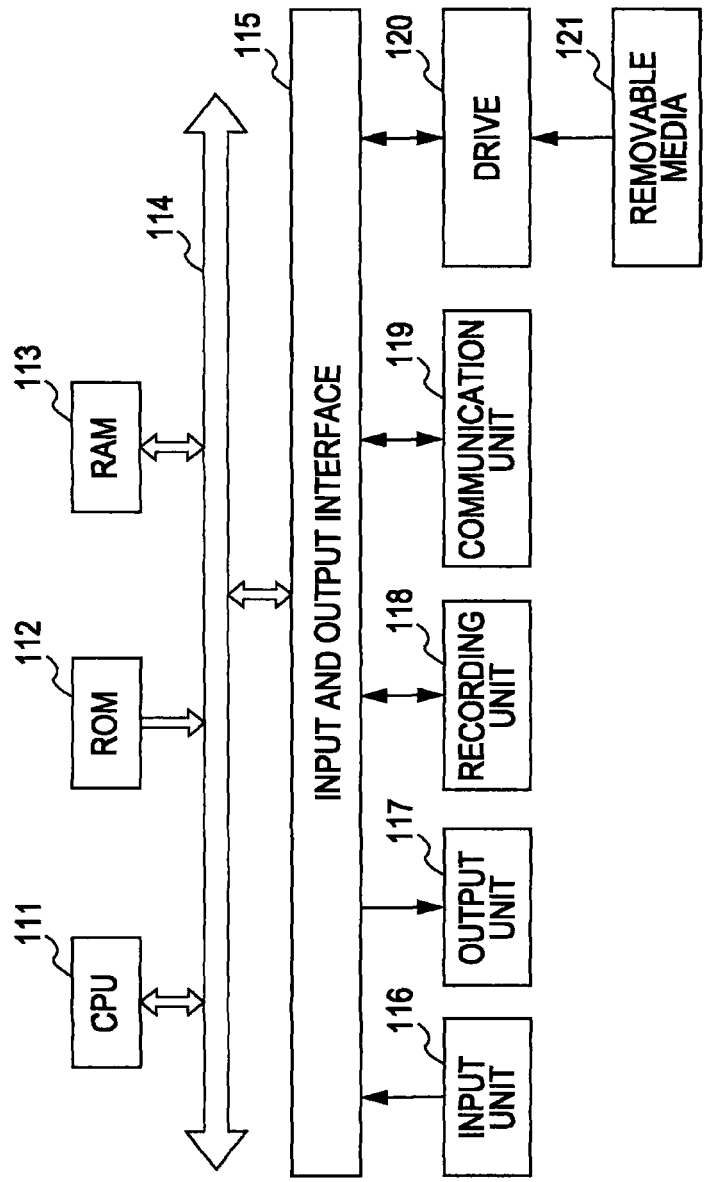
FIG. 11 is a block diagram of a configuration example of a computer adapted to execute an information processing by way of software according to an embodiment of the present invention.

FIG. 11 is a block diagram of a configuration example of a computer adapted to execute the above-described series of processings by way of a program. A CPU (Central Processing Unit) 111 is adapted to execute various processing while following a program recorded on a ROM (Read Only Memory) 112 or a recording unit 118. A RAM (Random Access Memory) 113 appropriately stores the program executed by the CPU 111, data, and the like. The CPU 111, the ROM 112, and the RAM 113 are mutually connected via a bus 114.

An input and output interface 115 is also connected to the CPU 111 via the bus 114. An input unit 116 composed of a microphone and the like and an output unit 117 composed of a display, a speaker, and the like are connected to the input and output interface 115. The CPU 111 is adapted to execute various processing corresponding to an instruction input from the input unit 116. Then, the CPU 111 outputs the processing result to the output unit 117.

The recording unit 118 connected to the input and output interface 115 is composed, for example, of hard disc. The recording unit 118 is adapted to record the program executed by the CPU 111 and various pieces of data. A communication unit 119 is adapted to communicate with an external apparatus via the internet or a local area network.

In addition, a program may be obtained via the communication unit 119 to be recorded in the recording unit 118.

When a removable media 121 such as a magnetic disc, an optical disc, an opto-magnetic disc, or a semiconductor memory is mounted, a drive 120 connected to the input and output interface 115 is adapted to drive the removable media 121 and obtain the program, the data, and the like recorded on the removable media 121. The thus obtained program and data are transferred to the recording unit 118 and recorded as occasion demands.

As illustrated in FIG. 11, the program recording medium storing the program which is installed into the computer and can be executed by the computer is composed of the removable media 121 which is a package media composed of a magnetic disc (including a flexible disc), an optical disc (CD-ROM (Compact Disc-Read Only Memory), a DVD (including Digital Versatile Disc)), an opto-magnetic disc, a semiconductor memory, etc., the ROM 112 temporarily or enduringly storing the program, the hard disc structuring the recording unit 118, or the like. Storage of the program into the program recording medium is performed as appropriate via the communication unit 119 which is an interface such as a router or a modem by utilizing a wired or wireless communication medium such as a local area network, the internet, or digital satellite broadcasting.

It should be noted that in the present specification, the embodiments of the present invention of course include the processing in which the steps describing the program stored in the recording medium are executed in the stated order in a time series manner, and also include the processing in which the steps are not executed in the time series manner but executed in parallel or individually.

In addition, in the present specification, the system represents an entire apparatus composed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus used by a first user, comprising:
a processor that executes;
a generating unit configured to generate recommendation information at least including an identifier, a standard ID, and a title text list, for uniquely identifying a content recommended on the basis of preference information of the first user, the identifier belonging to either a standard system in conformity to a predetermined specification and an independent system based on an independent specification; and
a sending unit configured to send the generated recommendation information to another information processing apparatus which is used by a second user who is the same as or different from the first user and adapted to present the content recommended on the basis of the identifier included in the recommendation information;
wherein the another information processing apparatus is configured to recognize whether the identifier belongs to either the standard system or the independent system and if the identifier belongs to the independent system, the another information processing apparatus sends the standard ID and the title text list to a music recommendation server where the standard ID is translated into an independent ID.

2. The information processing apparatus according to claim 1,
wherein the generating unit generates, in a case where the identifier belongs to the standard system, the recommendation information on the basis of the identifier belonging to the standard system.

3. The information processing apparatus according to claim 1,
wherein the recommendation information further includes identification information for identifying the content in addition to the identifier, and
wherein the generating unit generates, in a case where the identifier belongs to the independent system, the recommendation information on the basis of an identifier belonging to the standard system corresponding to the identification information which is obtained through inquiring a management apparatus adapted to specify the identifier belonging to the standard system from the identification information;
wherein the identification information includes the title text list.

4. The information processing apparatus according to claim 3,
wherein the recommendation information further includes character information representing a character of the first user.

5. The information processing apparatus according to claim 3,
wherein the sending unit sends the recommendation information to the management apparatus, and
wherein the management apparatus accumulates the recommendation information as a history.

6. The information processing apparatus according to claim 1,
wherein types of the content include a music, a still image, a motion picture, and an electronic book, and the identifier is constructed on the basis of each of the types.

7. An information processing method for an information processing apparatus used by a first user, the information processing method comprising the steps of:
generating recommendation information at least including an identifier, a standard ID, and a title text list for uniquely identifying a content recommended on the basis of preference information of the first user, the identifier belonging to either a standard system in conformity to a predetermined specification and an independent system based on an independent specification; and
performing a control to send the generated recommendation information to another information processing apparatus which is used by a second user who is the same as or different from the first user and adapted to present the content recommended on the basis of the identifier included in the recommendation information;
wherein the another information processing apparatus recognizes whether the identifier belongs to either the standard system or independent system and if the identifier belongs to the independent system, the another information processing apparatus sends the standard ID and the title text list to a music recommendation server where the standard ID is translated into an independent ID.

8. A non-transitory computer readable storage medium storing a computer program for causing a computer adapted to control an apparatus used by a first user to perform a method, the method, comprising the steps of:
generating recommendation information at least including an identifier a standard ID, and a title text list for uniquely identifying a content recommended on the basis of preference information of the first user, the identifier belonging to either a standard system in conformity to a predetermined specification and an independent system based on an independent specification; and
performing a control to send the generated recommendation information to another apparatus which is used by a second user who is the same as or different from the first user and adapted to present the content recommended on the basis of the identifier included in the recommendation information;
wherein the another apparatus recognizes whether the identifier belongs to either the standard system or the independent system and if the identifier belongs to the independent system, the another apparatus sends the standard ID and the title text list to a music recommendation server where the standard ID is translated into an independent ID.

9. An information processing apparatus used by a first user, comprising:
a processor that executes;
a receiving unit configured to receive recommendation information sent from another information processing apparatus which is used by a second user who is the same as or different from the first user and adapted to generate the recommendation information at least including an identifier, a standard ID, and a title text list for uniquely identifying a content recommended on the basis of preference information of the second user, the identifier belonging to either a standard system in conformity to a predetermined specification and an independent system based on an independent specification; and
a presenting unit configured to present the content recommended on the basis of the received recommendation information to the first user;
wherein the receiving unit is configured to recognize whether the identifier belongs to either the standard system or the independent system and if the identifier belongs to the independent system, the receiving unit sends the standard ID and the title text list to a music recommendation server where the standard ID is translated into an independent ID.

10. The information processing apparatus according to claim 9,
wherein the presenting unit presents, in a case where the identifier belongs to the standard system, the content recommended on the basis of the identifier belonging to the standard system.

11. The information processing apparatus according to claim 9,
wherein the recommendation information further includes identification information for identifying the content in addition to the identifier, and
wherein the presenting unit presents, in a case where the identifier belongs to the independent system, the content corresponding to the identification information recommended through inquiring a recommendation apparatus adapted to specify the content corresponding to the identifier belonging to the independent system at least from the identification information and recommend the content;
wherein the identification information includes the title text list.

12. The information processing apparatus according to claim 11,
wherein the recommendation information further includes character information representing a character of the second user.

13. The information processing apparatus according to claim 9,
wherein the presenting unit presents, in a case where a type of a content desired by the first user is different from a type of the content recommended on the basis of the recommendation information, a content of the desired type recommended through inquiring a management apparatus adapted to recommend the content of the predetermined type on the basis of the recommendation information.

14. The information processing apparatus according to claim 13,
wherein the management apparatus accumulates the recommendation information and recommends the content on the basis of the accumulated recommendation information, and
wherein the presenting unit presents the content recommended from the management apparatus.

15. The information processing apparatus according to claim 14, further comprising:
a sending unit configured to send a preference response related to a preference of the first user with respect to the content recommended from the management apparatus to the management apparatus,
wherein the management apparatus accumulates the recommendation information and the preference response and recommends the content on the basis of the accumulated recommendation information and preference response.

16. The information processing apparatus according to claim 13,
wherein types of the content include a music, a still image, a motion picture, and an electronic book, and the identifier is constructed on the basis of each of the types.

17. An information processing method for an information processing apparatus used by a first user, the information processing method comprising the steps of:

performing a control to receive recommendation information sent from another information processing apparatus which is used by a second user who is the same as or different from the first user and adapted to generate the recommendation information at least including an identifier, a standard ID, and a title text list for uniquely identifying a content recommended on the basis of preference information of the second user, the identifier belonging to either a standard system in conformity to a predetermined specification and an independent system based on an independent specification;
recognizing whether the identifier belongs to either the standard system or the independent system and if the identifier belongs to the independent system, sending the standard ID and the title text list to a music recommendation server where the standard ID is translated into an independent ID; and
presenting the content recommended on the basis of the received recommendation information to the first user.

18. A non-transitory computer readable storage medium storing a computer program for causing a computer adapted to control an apparatus used by a first user to perform a method, the method, comprising the steps of:
performing a control to receive recommendation information sent from another information processing apparatus which is used by a second user who is the same as or different from the first user and adapted to generate the recommendation information at least including an identifier, a standard ID, and a title text list for uniquely identifying a content recommended on the basis of preference information of the second user, the identifier belonging to either a standard system in conformity to a predetermined specification and an independent system based on an independent specification;
recognizing whether the identifier belongs to either the standard system or the independent system and if the identifier belongs to the independent system, sending the standard ID and the title text list to a music recommendation server where the standard ID is translated into an independent ID; and
presenting the content recommended on the basis of the received recommendation information to the first user.

19. An information processing system comprising:
a first information processing apparatus used by a first user; and
a second information processing apparatus used by a second user who is the same as or different from the first user,
the first information processing apparatus including
a processor that executes;
a generating unit configured to generate recommendation information at least including an identifier, a standard ID, and a title text list for uniquely identifying a content recommended on the basis of preference information of the first user, the identifier belonging to either a standard system in conformity to a predetermined specification and an independent system based on an independent specification, and
a sending unit configured to send the generated recommendation information to the second information processing apparatus, and
the second information processing apparatus including
a processor that executes;
a receiving unit configured to receive the recommendation information sent from the first information processing apparatus, and a presenting unit configured to present the content recommended on the basis of the identifier included in the received recommendation information to the second user;

wherein the second information processing apparatus is configured to recognize whether the identifier belongs to either the standard system or the independent system and if the identifier belongs to the independent system, the second information processing apparatus sends the standard ID and the title text list to a music recommendation server where the standard ID is translated into an independent ID.

20. The information processing apparatus according to claim 3, the management apparatus specifying the identifier belonging to the standard system from the identification information by applying predetermined text analysis processing on the identification information.

21. The information processing apparatus according to claim 11, the recommendation apparatus specifying the content corresponding to the identifier belonging to the independent system by text fuzzy search processing.

22. The information processing apparatus according to claim 1, wherein the identifier, the standard ID, and the title text list are arranged adjacent one another in the recommendation information and the identifier is 1-bit.

* * * * *